(No Model.)

C. F. GERLING.
BROOM.

No. 304,266. Patented Aug. 26, 1884.

Witnesses,
S. R. Tibbitts
Geo. B. Tibbitts

Inventor,
Chas. Fredrick Gerling
By Geo. W. Tibbitts Atty

UNITED STATES PATENT OFFICE.

C. FREDRICK GERLING, OF CLEVELAND, OHIO.

BROOM.

SPECIFICATION forming part of Letters Patent No. 304,266, dated August 26, 1884.

Application filed January 10, 1884. (No model.)

*To all whom it may concern:*

Be it known that I, CHARLES FREDRICK GERLING, of Cleveland, in the county of Cuyahoga and State of Ohio, have invented certain new and useful Improvements in Broom-Holders, of which the following is a specification.

This invention relates to a device for holding a number of brooms, and is constructed and operates substantially as hereinafter described and claimed.

Figure 1:
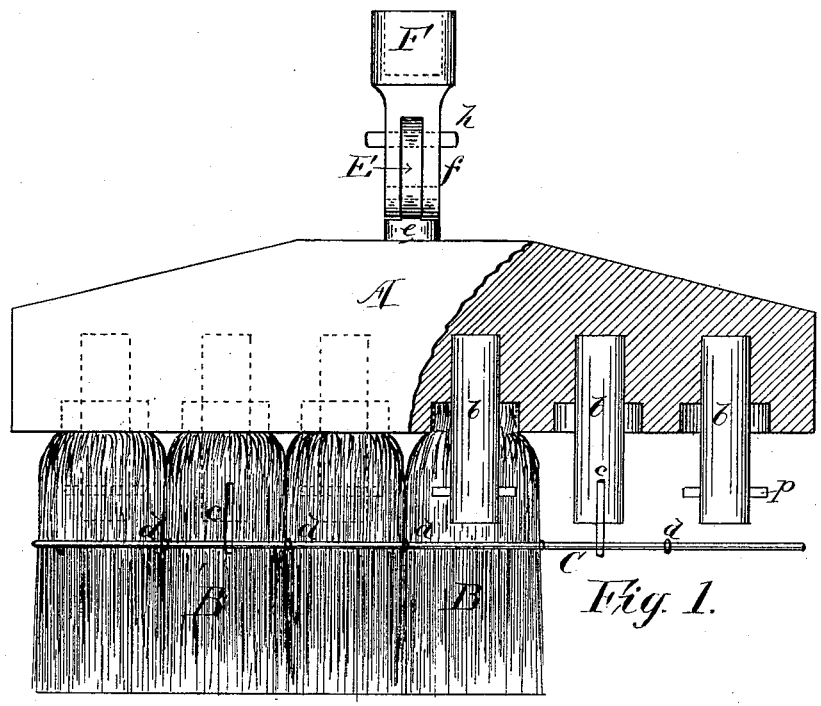
Figure 3:
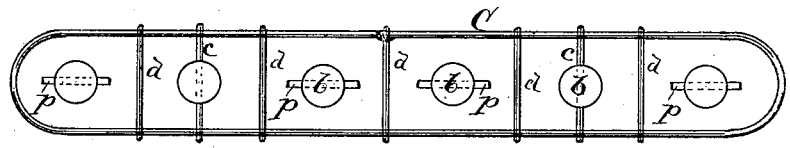
Figure 2:
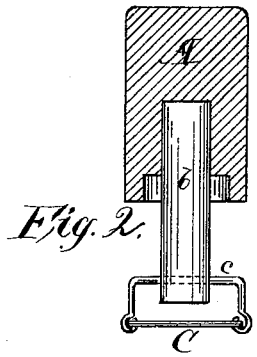

In the drawings, Figure 1 is a side elevation of my new broom-holder, partly in section, showing method of constructing and attaching the brooms. Fig. 2 is a transverse section of the same. Fig. 3 is a horizontal section through Fig. 1, showing band-wire and cross-wires around and through the brooms.

A, Figs. 1 and 2, is a head, which may be made of wood or any other suitable material, in which are made a number of holes for holding a number of brooms or brushes. The said holes are enlarged or countersunk to form a recess for the broom or brush material where it is attached to the stem.

B B are brooms, which may be made of broom-corn, bristles, or other suitable material for the purpose. The stems $b$ have a short pin, $p$, projecting through them, and the corn or bristles are attached to the stems surrounding them and embracing the pins. The upper ends of the corn or bristles are firmly secured to the stems by wire or cord wound tightly around them. These brooms or brushes are made by taking a long turned stick and attaching the corn thereon, as above mentioned, at suitable intervals, and then the said stick is cut into short lengths between the broom parts. These brooms or brushes are put into the head and secured therein by means of glue or nails. A band of wire, C, is secured by means of short wire rods $c$, passed through the stems $b$ and bent or twisted around the band. Cross-wires $d$ are also put between the brooms and secured to the band, which completes the holder and holds the brooms smoothly in line. The head A is provided with an adjustable staff-holder, consisting of a tenon, $e$, having a disk, E.

F is a socket for a staff, having a bifurcated extension, $f$, which embraces the disk, and is pivoted thereto at $g$, forming a pivotal joint. The said extension is pierced with holes, through which a pin, $p$, is put to hold the handle or staff in position. The handle is thus made adjustable to an angle or other position with the holder, as may be desired.

I am aware that broom-holders and combinations of brooms have been made heretofore, and I do not therefore claim, broadly, such; but What I do claim is—

The herein-described broom, consisting of the head A, having countersunk holes, brooms B, attached to stems $b$, secured in the holes of the head, and provided with pins $p$ and wires $c$, band C, and cross-wires $d$, the parts being constructed and combined for use substantially as shown.

C. FREDRICK GERLING.

Witnesses:
GEO. W. TIBBITTS,
M. G. NORTON.